US006448481B2

(12) United States Patent
Maehara et al.

(10) Patent No.: US 6,448,481 B2
(45) Date of Patent: Sep. 10, 2002

(54) PEDAL MECHANISMS ASSEMBLED INTO UNIT AND KEYBOARD MUSICAL INSTRUMENT EQUIPPED WITH THE SAME

(75) Inventors: Kazuo Maehara; Yoshikatsu Tateishi, both of Shizuoka (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/847,098

(22) Filed: May 1, 2001

(30) Foreign Application Priority Data

May 2, 2000 (JP) ....................................... 2000-133171

(51) Int. Cl.[7] ................................................. G01C 3/26

(52) U.S. Cl. ............................. 84/225; 84/229; 84/353; 84/426; 84/438

(58) Field of Search .......................... 84/426, 438, 225, 84/229, 230, 231, 332, 353

(56) References Cited

U.S. PATENT DOCUMENTS

| | | | | |
|---|---|---|---|---|
| 422,477 A | * | 3/1890 | Weser | 84/225 |
| 1,090,487 A | * | 3/1914 | Lunde et al. | 84/225 |
| 4,041,829 A | * | 8/1977 | Robeson et al. | 84/225 |

* cited by examiner

*Primary Examiner*—Shih-Yung Hsieh
(74) *Attorney, Agent, or Firm*—Morrison & Foerster LLP

(57) ABSTRACT

A damper pedal mechanism, a sostenuto/muffler pedal mechanism and a damper pedal mechanism are incorporated in an acoustic piano for artistic expression, and are independently actuated by a pianist, wherein component parts are assembled into the pedal mechanisms on a base plate, and, thereafter, the pedal mechanism unit is installed in a piano housing so that a factory worker feels the assembling work comfortable.

17 Claims, 8 Drawing Sheets

PEDAL MECHANISMS ASSEMBLED INTO UNIT AND KEYBOARD MUSICAL INSTRUMENT EQUIPPED WITH THE SAME

FIELD OF THE INVENTION

This invention relates to a keyboard musical instrument and, more particularly, to a keyboard musical instrument equipped with pedal mechanisms for artistic expression.

DESCRIPTION OF THE RELATED ART

A grand piano, an upright piano and an automatic player piano are categorized in the keyboard musical instrument. These keyboard musical instruments have strings, and piano tones are generated through the vibrations of the strings. Pianists wish to bring on changes of the piano tones for artistic expression. A pianist brings on the change by prolonging the piano tone, and another pianist lessens the loudness by causing fewer than the normal number of strings to be struck or bringing the hammers nearer the strings. The tools for the artistic expression are pedal mechanisms incorporated in the grand/upright pianos. These pedal mechanisms are called as "soft pedal mechanism", "muffler pedal mechanism", "damper pedal mechanism" and "sostenuto pedal mechanism". The pianists selectively actuate the pedal mechanisms during the performance as described in Japanese Patent Publication of Unexamined Application (laid-open) No. 2-48695 and Japanese Utility Model Publication of Examined Application No. 58-25426. A standard upright piano is equipped with the soft pedal mechanism, the muffler pedal mechanism and the damper pedal mechanism. On the other hand, the soft pedal mechanism, the sostenuto pedal mechanism and the damper pedal mechanism are incorporated in a standard grand piano. Those pedal mechanisms are briefly described hereinbelow.

The soft pedal mechanism of the upright piano is connected to a hammer rail. Plural hammer rail felts are attached to the rear surface of the hammer rail, and hammers are resting on the hammer rail felts before the actuation of associated action mechanisms. The pianist is assumed to step on the soft pedal. The soft pedal mechanism advances the hammer rail toward the strings. The hammer rail rearward urges the hammers, and, accordingly, the gap between the hammers and the strings is decreased. When the pianist depresses the black/white key, the depressed key actuates the action mechanism. The jack escapes from the hammer, and the hammer starts free rotation toward the set of strings. Although the hammer strikes the strings, the intensity of impact is weaker than the normal intensity, because the strike takes place immediately after the escape. This results in that the strings vibrate softly, and the volume is lessened.

The muffler pedal mechanism is linked with a muffler rail. Muffler felts are attached to the muffler rail. When the pianist steps on the muffler pedal, the muffler felts are moved into the space between the strings and the action mechanisms. The depressed key gives rise to escape of the jack from the hammer, and the hammer starts the free rotation toward the strings. The strings are struck with the hammer. However, there is the muffler felt between the hammer and the strings. For this reason, the piano tone is softened.

The damper pedal mechanism of the upright piano is connected to a damper rod. The damper rod laterally extends in the vicinity of the array of damper levers. While the pianist does not exerts any force on the damper pedal, the damper rod is spaced from the damper levers, and the damper levers are selectively rotated by the depressed keys so as to space the damper head assemblies from the associated sets of strings. The pianist is assumed to step on the damper pedal. The damper rod urges all the damper levers so as to keep the damper head assemblies spaced from the sets of strings. The depressed key gives rise to the escape of the jack from the hammer, and the hammer strikes the associated set of strings at the end of the free rotation. The strings vibrate for generating the piano tone. When the pianist releases the depressed key, the black/white key starts to return to the rest position. Although the released key is spaced from the damper lever, the damper rod keeps the damper head assembly spaced from the set of strings. For this reason, the vibrations are continued, and the piano tone is prolonged.

The soft pedal mechanism of the grand piano is linked with action mechanisms/hammers. While the soft pedal is resting, the hammers are directly opposed to the sets of strings. All the strings of each set are struck by the associated hammer for generating the piano tone. However, when the pianist steps on the soft pedal, the action mechanisms laterally slide, and each of the hammers is opposed to the strings fewer than the normal number of strings. When the pianist depresses the associated black/white key, the depressed key actuates the action mechanism, and, thereafter, causes the jack to escape from the hammer. The escape gives rise to free rotation of the hammer toward the strings. The fewer strings are struck with the hammer, and vibrate for generating the piano tone at loudness smaller than the usual loudness.

The sostenuto pedal mechanism of the grand piano is linked with a sostenuto rod. The sostenuto rod laterally extends in the vicinity of the dampers. While the sostenuto pedal is resting, the dampers are free from the sostenuto rod, and the dampers are spaced from and brought into contact with the associated strings depending upon the key positions. The pianist is assumed to step on the sostenuto pedal after depressing the black/white key. The sostenuto rod keeps the damper head assembly spaced from the strings, and does not permit the damper head assembly to be brought into contact with the strings. Even though the pianist releases the depressed key, the damper head assembly remains spaced, and the piano tone is prolonged. Thus, the pianist individually prolongs the piano tone by means of the sostenuto pedal mechanism.

The damper pedal mechanism of the grand piano also keeps the damper head assemblies spaced from the sets of strings for prolonging the piano tones. The damper pedal mechanism is connected to a lifting rail laterally extending under damper levers. While the damper pedal is resting, the lifting rail remains spaced from the damper levers, and the damper head assemblies are spaced from and brought into contact with the sets of strings depending upon the key positions. The pianist is assumed to step on the damper pedal. The lifting rail pushes up all the damper levers, and causes the damper wires to space all the damper head assemblies from the sets of strings. A depressed key actuates the action mechanism, and gives rise to the free rotation of the hammer through the escape of the jack. The strings are struck with the hammer, and the strings vibrate for generating the piano tone. When the pianist releases the depressed key, the black/white key starts to return toward the rest position. Although the released key does not urge the damper lever, the lifting rail keeps the damper head assemblies spaced from the sets of strings, and the piano tone is prolonged. While the pianist is keeping the damper pedal depressed, all the piano tones are prolonged.

As will be understood, the pedal mechanisms independently bring on the changes for the artistic expression.

Accordingly, each of the pedal mechanisms is independent of the other pedal mechanisms. In order to make the independent pedal mechanisms clear, description is made on the arrangement of the prior art pedal mechanisms.

FIGS. 1 to 6 show the prior art pedal mechanisms incorporated in the standard grand piano. The standard grand piano comprises a piano housing 1 and a pedal box 2. The pedal box 2 is hung from the piano housing 1 by means of a lyre block and a lyre post, and a soft pedal 3, a sostenuto pedal 4 and a damper pedal 5 are swingably supported by the pedal box 2. The soft pedal 3 and the damper pedal 5 project from the left side and the right side of the pedal box 2, and the sostenuto pedal 4 is located between the soft pedal 3 and the damper pedal 5. Three pedal rods 10, 11 and 12 are linked with the soft pedal 3, the sostenuto pedal 4 and the damper pedal 5, respectively, and extend from the pedals 3, 4 and 5 upwardly.

Various boards are assembled into the piano housing 1. One of the boards is a key bed 1*a*. A keyboard 1*b* includes black/white keys and a key frame 1*c*, and is mounted on the key bed 1*a*. Action mechanisms 1*d* are linked with the black/white keys of the keyboard 1*b*. Hammer assemblies 1*e* are rotatably supported by a shank flange rail 1*f*, which in turn is supported by action brackets 1*g*. The hammers 1*e* are linked with the action mechanisms 1*d*, respectively. Strings 1*h* are stretched over the hammers 1*e*, and are to be struck with the hammers 1*e*. Dampers 1*i* are linked with the rear portions of the black/white keys, and are spaced from and brought into contact with the associated strings 1*h*.

When a pianist depresses one of the black/white keys, the front portion of the depressed key is sunk, and, accordingly, the rear portion is lifted so as to actuate the associated action mechanism 1*d*. The rear portion of the depressed key pushes the damper 1*i* upwardly, and the damper 1*i* is spaced from the associated strings 1*h*. Then, the strings 1*h* get ready for vibrating. When the jack (not shown) escapes from the hammer 1*e*, the hammer 1*e* is driven for free rotation toward the strings 1*h*. The strings 1*h* are struck with the hammer 1*e* at the end of the free rotation, and vibrates for generating the piano tone. The hammer 1*e* rebounds on the strings 1*h*, and returns to the action mechanism 1*d*. After the generation of the piano tone, the pianist releases the depressed key, and the rear portion of the released key is sunk. The released key allows the damper 1*i* to be brought into contact with the strings 1*h*, and the vibrations are absorbed. Thus, the component parts 1*b*/1*d*/1*e*/1*g*/1*h* are sequentially activated along the well-known process for generating the piano tone.

The prior art pedal mechanisms includes the soft/sostenuto/damper pedals 3/4/5 and the pedal rods 10/11/12 as described hereinbefore. The pedal rods 10/11/12 are connected to the soft/sostenuto/damper pedals 3/4/5, respectively, and are vertically moved by means of the associated pedals 3/4/5. Three link works are connected between the pedal rods 10/11/12 and the key frame 1*c*, a sostenuto lift rod 1*j* and a lifting rail 1*k*, respectively.

As will be better seen in FIG. 3, the link work of the soft pedal mechanism includes a pedal lever 6, a bearing unit 13, a pin 14 and a stopper 20. The pedal rod 10 is held in contact with the left end portion of the pedal lever 6. The right end portion of the pedal lever 6 is connected to another lever, and is supported by the bearing unit 13 through the pin 14. The stopper 20 sets a limit to the moving range of the pedal lever 6 (see FIG. 4). The stopper 20 and the bearing unit 13 are directly attached to the lower surface of the key bed 9.

The link work of the sostenuto pedal mechanism includes pedal levers 7, a bearing unit 13, a pin 14, a return spring 15 (see FIG. 5) and a stopper 20. The pedal levers 7 are connected to each other. The pedal rod 11 is held in contact with the right end portion of the pedal lever 7, and the left end portion of the other pedal lever 7 is connected to the sostenuto lift rod 1*j*. The pedal lever 7 is supported by the bearing through the pin 14, and the return spring urges the pedal lever 7 downwardly. The stopper sets a limit on the moving range of the pedal lever 7. The bearing unit 13 and the stopper 20 are directly attached to the lower surface of the key bed 9, and the return spring 15 is inserted between the lower surface of the key bed 9 and the pedal lever 7.

The link work of the damper pedal mechanism includes a pedal lever 8, a bearing unit 13, a pin 14, a return spring 15 (see FIG. 6) and a stopper 20. The pedal rod 12 is held in contact with the right end portion of the pedal lever 8, and a vertical rod is fixed to an intermediate portion of the pedal lever 8. The vertical rod is held in contact with the lower surface of the lifting rail 1*k*. The pedal lever 8 is supported by the bearing 13 through the pin 14, and the stopper sets a limit to the moving range of the pedal lever 8. The return spring 15 urges the pedal lever 8 downwardly. The bearing unit 13 and the stopper 20 are directly attached to the lower surface of the key bed 9, and the return spring 15 is inserted between the lower surface of the key bed 9 and the pedal lever 8.

Thus, the three link works are directly attached to the lower surface of the key bed 9, and the force exerted on the soft/sostenuto/damper pedals 3/4/5 is independently transmitted through the three link works to the key frame 1*c*, the sostenuto lift rod 1*j* and the lifting rail 1*k*.

FIG. 7 shows the prior art pedal mechanisms incorporated in the standard upright piano. A soft pedal, a muffler pedal and a damper pedal are designated by reference numerals 25, 26 and 27, respectively. Various boards are assembled into a piano housing. A bottom board 28*a* and a bottom sill 28*b* form parts of the piano housing. The soft pedal mechanism, the muffler pedal mechanism and the damper pedal mechanism are installed inside the piano housing, and the soft pedal 25. The sostenuto pedal 26 and the damper pedal 27 are rotatably supported by brackets 29, respectively, and the brackets are fixed to the upper surface of the bottom board 28*a*. Holes are formed in the bottom sill 28*b*, and the soft pedal 25, the muffler pedal 26 and the damper pedal 27 project through the holes to the outside of the piano housing.

The soft pedal 25 is connected at the rear end portion thereof to the right end portion of a soft pedal lever 30*a*, which in turn is connected at the left end portion to a lower end of a soft pedal rod 31. The soft pedal lever 30*a* is swingably supported by a bearing unit 37, and a coil spring 38 urges the soft pedal lever 30*a* upwardly. The bearing unit 37 is fixed to the upper surface of the bottom board 28*a*, and the coil spring 38 is inserted between the upper surface of the bottom board 28*a* and the lower surface of the soft pedal lever 30*a*.

The muffler pedal 26 is connected at the rear end thereof to a link work. The link work includes muffler rods 33 and muffler link levers 34, and the muffler 36 is connected to the link work.

The damper pedal 27 is connected at the rear end thereof to the right end portion of a damper pedal lever 30*b*, which in turn is connected at the left end portion to the lower end of the damper pedal rod 32. The damper pedal lever 30*b* is swingably supported by a bearing unit 37, and a coil spring 38 urges the damper pedal lever 30*b* upwardly. The bearing unit 37 is fixed to the upper surface of the bottom board 28*a*, and the coil spring 38 is inserted between the upper surface of the bottom board 28*a* and the lower surface of the damper pedal lever 30*b*. Thus, the pedal mechanisms of the standard upright piano are directly supported by the bottom board, and the force exerted on the soft/muffler/damper pedals 25/26/27 is independently transmitted through the link works.

Another prior art bottom board is disclosed in Japanese Patent Application of Unexamined Application No. 7-295551. The bottom board 28*a* and the bottom sill 28*b* are integrated into the bottom board disclosed in the Japanese Patent Publication of Unexamined Application. Three holes are formed in the narrow portion corresponding to the bottom sill 28*b,* and brackets are cut out in the wide portion corresponding to the bottom board 28*a.* The brackets serve as the brackets 29 and the parts of the bearing units 38. Moreover, spring seats are formed on the wide portion. The bottom board disclosed in the Japanese Patent Publication of Unexamined Application forms a piano housing together with other boards. Pedals and link works are assembled with the brackets, and the springs are inserted between the spring seats and the pedal levers.

A problem is encountered in the prior art pedal mechanisms in the assembling work. As described hereinbefore, each of the three pedal mechanisms is independent of the others. The prior art pedal mechanisms of the grand piano are directly supported by the key bed 9, and the prior art pedal mechanisms of the upright piano are directly supported by the bottom board 28*a.* Namely, the three pedal mechanisms are attached to the same board member. This means that a factory worker is expected to assemble the component parts into the three pedal mechanisms individually. The piano housing is completed before the assemblage of the pedal mechanisms. The factory worker gets into the space under the key bed 9, and starts the assembling work. The factory worker fixes the bearings 13 to the lower surface of the key bed 9 together with the pedal levers 6, 7 and 8. The factory worker further fixes the stoppers 20 to the lower surface of the key bed 9, and inserts the return springs 15 between the key bed 9 and the pedal levers 7/8. The space under the piano housing is so narrow that the factory worker feels the assembling work uncomfortable. The assembling work requires much time, and work efficiency is low. This results in a high production cost. Although the component parts are assembled into the three pedal mechanisms over the bottom board 28*a,* the bottom board 28*a* has been already assembled into the piano housing, and the working space is narrow. A factory worker fixes the brackets 29 and the bearing units 37 onto the bottom board 28*a,* and assembles the soft/muffler/damper pedals 25/26/27 and the pedal levers 30*a*/30*b* with the brackets 29 and the bearing units 37. Thereafter, the factory worker inserts the coil springs between the bottom board 28*a* and the pedal levers 30*a*/30*b,* and connects the pedal rods 31/32/33 to the pedal levers 30*a*/30*b* and the muffler pedal 26. The work efficiency is also low, and assembling work requires much time. As a result, the production cost is increased.

Although the factory worker does not need to fix the brackets 29 and the bearing units 37 on the bottom board disclosed in Japanese Patent Publication of Unexamined Application No. 7-295551, the pedals 25/26/27, the pedal levers 30*a*/30*b* and the pedal rods 31/32/33 are to be assembled after the complication of the piano housing, and the work efficiency is also low.

SUMMARY OF THE INVENTION

It is therefore an important object of the present invention to provide pedal mechanisms, which are easily assembled into a keyboard musical instrument.

It is also an important object of the present invention to provide a keyboard musical instrument, which is reduced in production cost.

To accomplish the object, the present invention proposes to assembly pedal mechanisms in a unit.

In accordance with one aspect of the present invention, there is provided a pedal system incorporated in a keyboard musical instrument comprising a base plate having a major surface and to be attached to a housing of the keyboard musical instrument, plural foot pedals swingably supported by the base plate, and plural link works provided on the major surface, movably supported by the base plate and connected to the plural foot pedals, respectively.

In accordance with another aspect of the present invention, there is provided a keyboard musical instrument comprising a keyboard having plural keys respectively assigned notes of a scale and selectively moved, plural sets of strings respectively associated with the plural keys and independently vibrating for generating tones at the notes, plural vibration generating mechanisms respectively connected to the plural keys for generating vibrations in the strings of the plural sets when the plural keys are selectively moved, a housing for accommodating the plural sets of strings and the plural vibration generating mechanisms and supporting the keyboard in such a manner as to expose the keyboard to the player, and plural pedal mechanisms linked with the plural vibration generating mechanisms, selectively actuated for changing attributes of the tones and including a base plate and component parts assembled into a unit attached to the housing.

BRIEF DESCRIPTION OF THE DRAWINGS

The features and advantages of the pedal mechanisms and the keyboard musical instrument will be more clearly understood from the following description taken in conjunction with the accompanying drawings in which.

DESCRIPTION OF THE PREFERRED EMBODIMENTS

First Embodiment

Figures 1, 2:
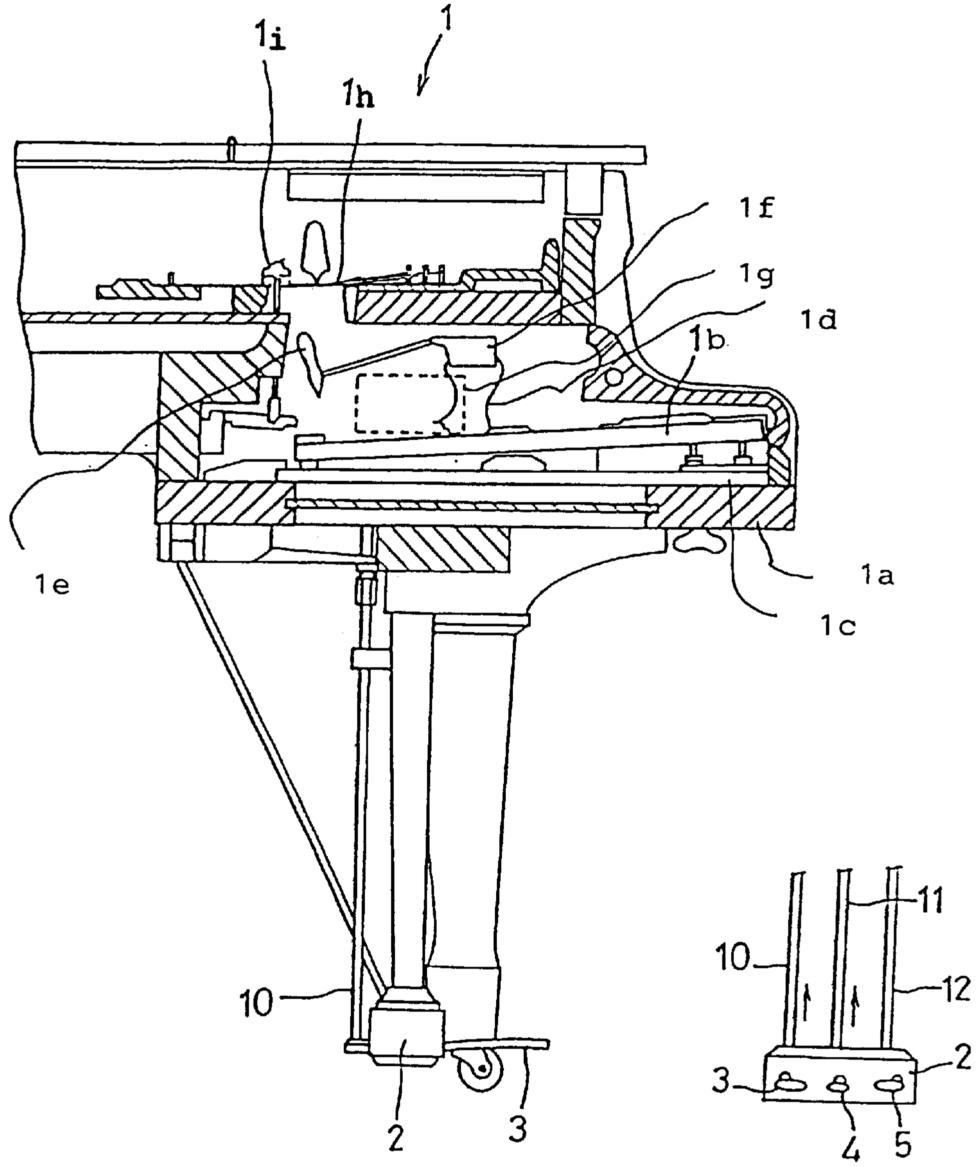
Fig. 1 PRIOR ART
Fig. 2 PRIOR ART
FIG. 1 is a partially cut-away side view showing the structure of the prior art grand piano.
FIG. 2 is a front view showing the arrangement of the three pedals of the prior art grand piano.
Figure 3:
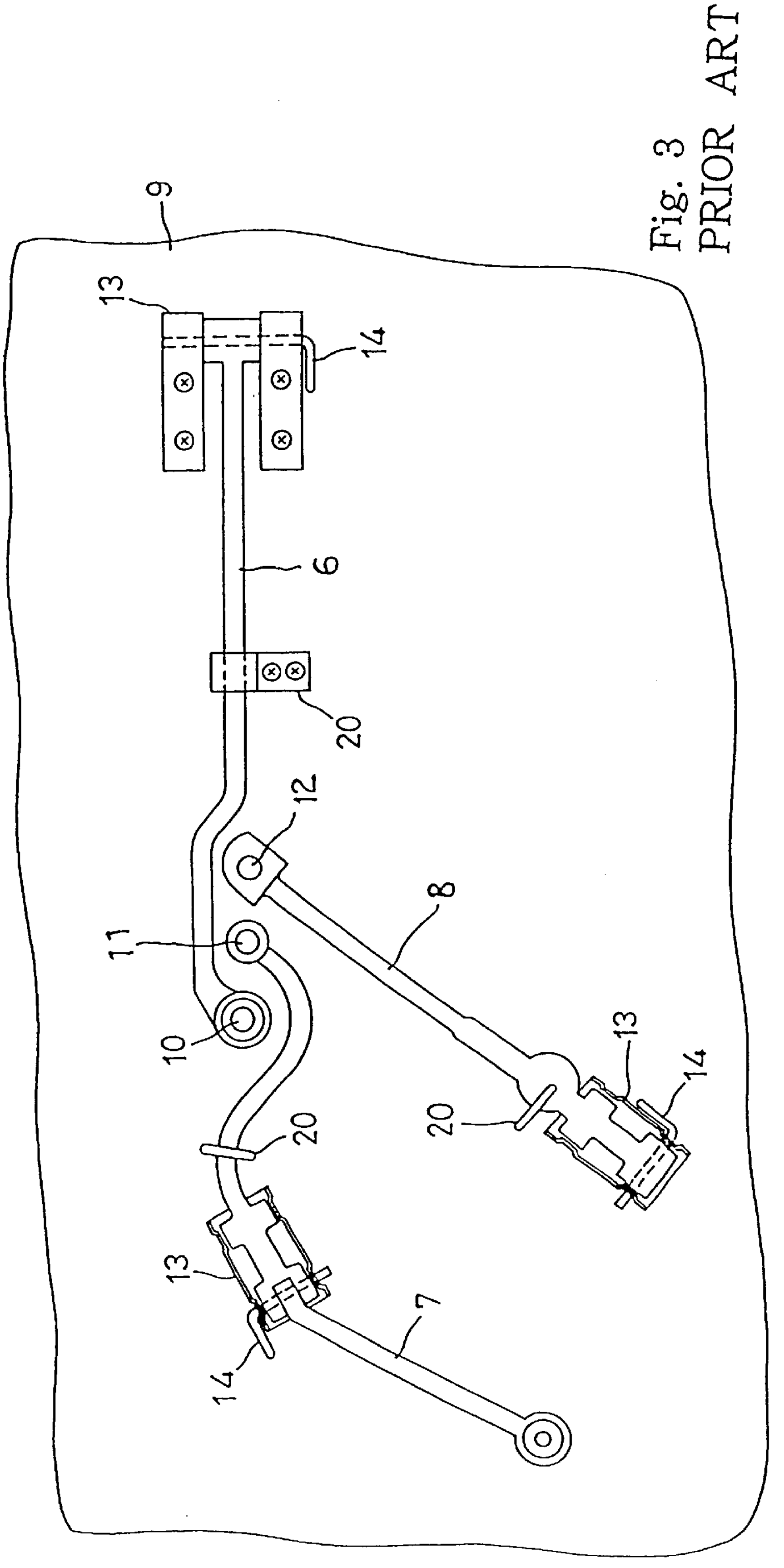
Fig. 3 PRIOR ART
FIG. 3 is a bottom view showing the arrangement of the pedal mechanisms incorporated in the prior art grand piano.
Figure 4:
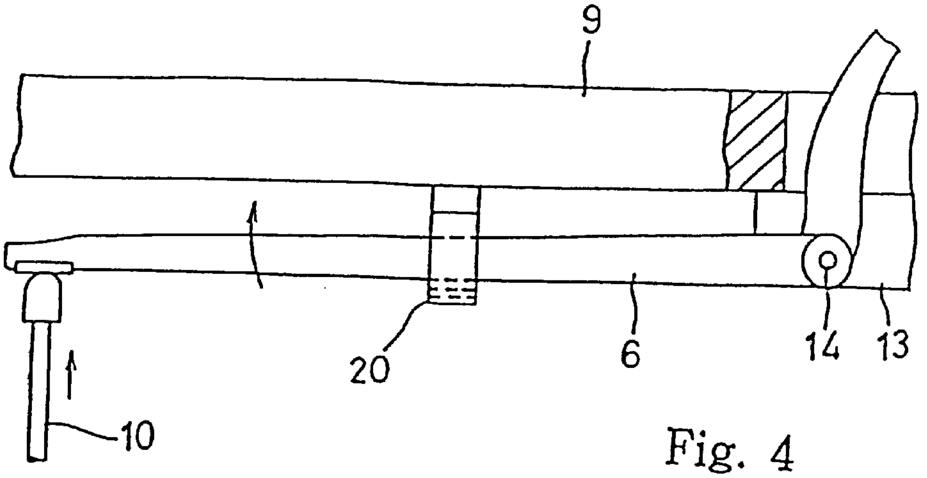
Fig. 4 PRIOR ART
FIG. 4 is a side view showing the arrangement of the prior art soft pedal mechanism.
Figure 5:
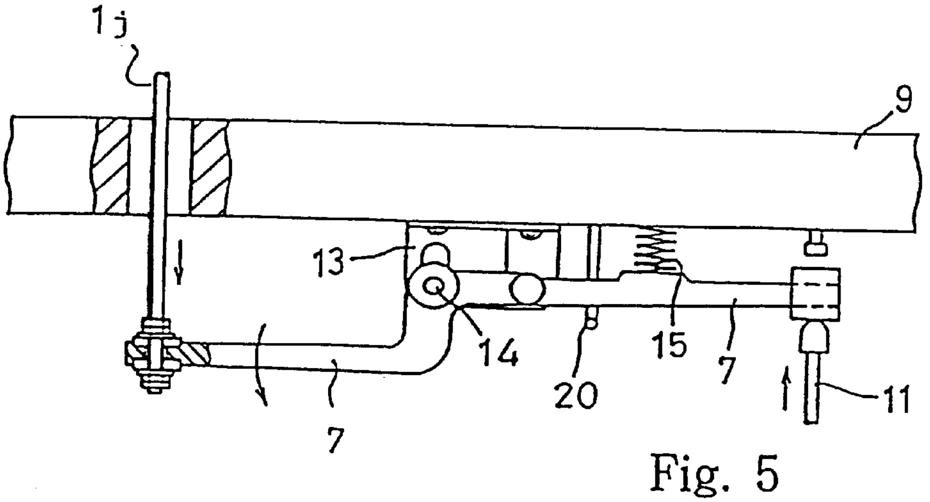
Fig. 5 PRIOR ART
FIG. 5 is a side view showing the arrangement of the prior art sostenuto pedal mechanism.
Figure 6:
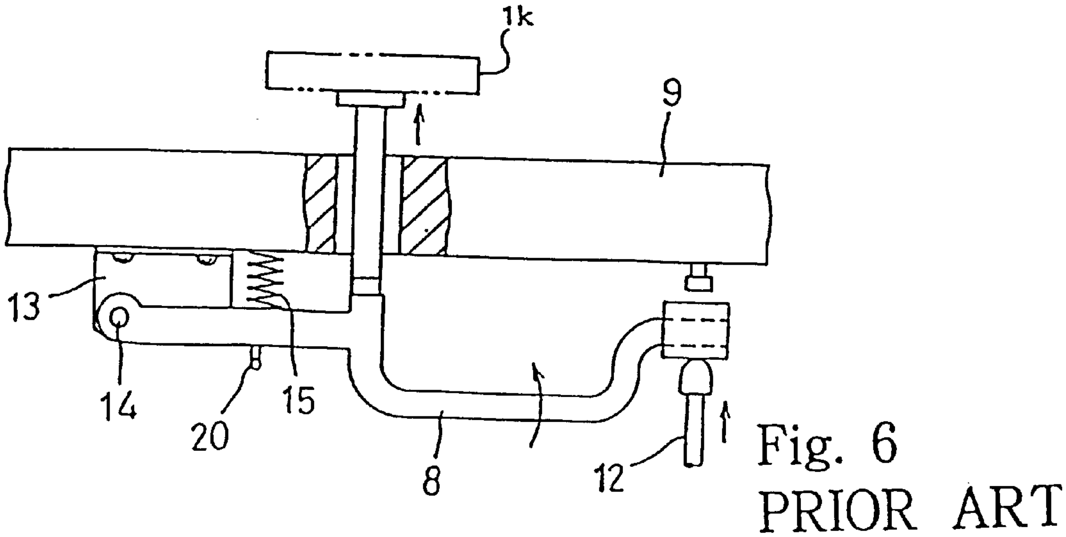
Fig. 6 PRIOR ART
FIG. 6 is a side view showing the arrangement of the prior art damper pedal mechanism.
Figure 7:
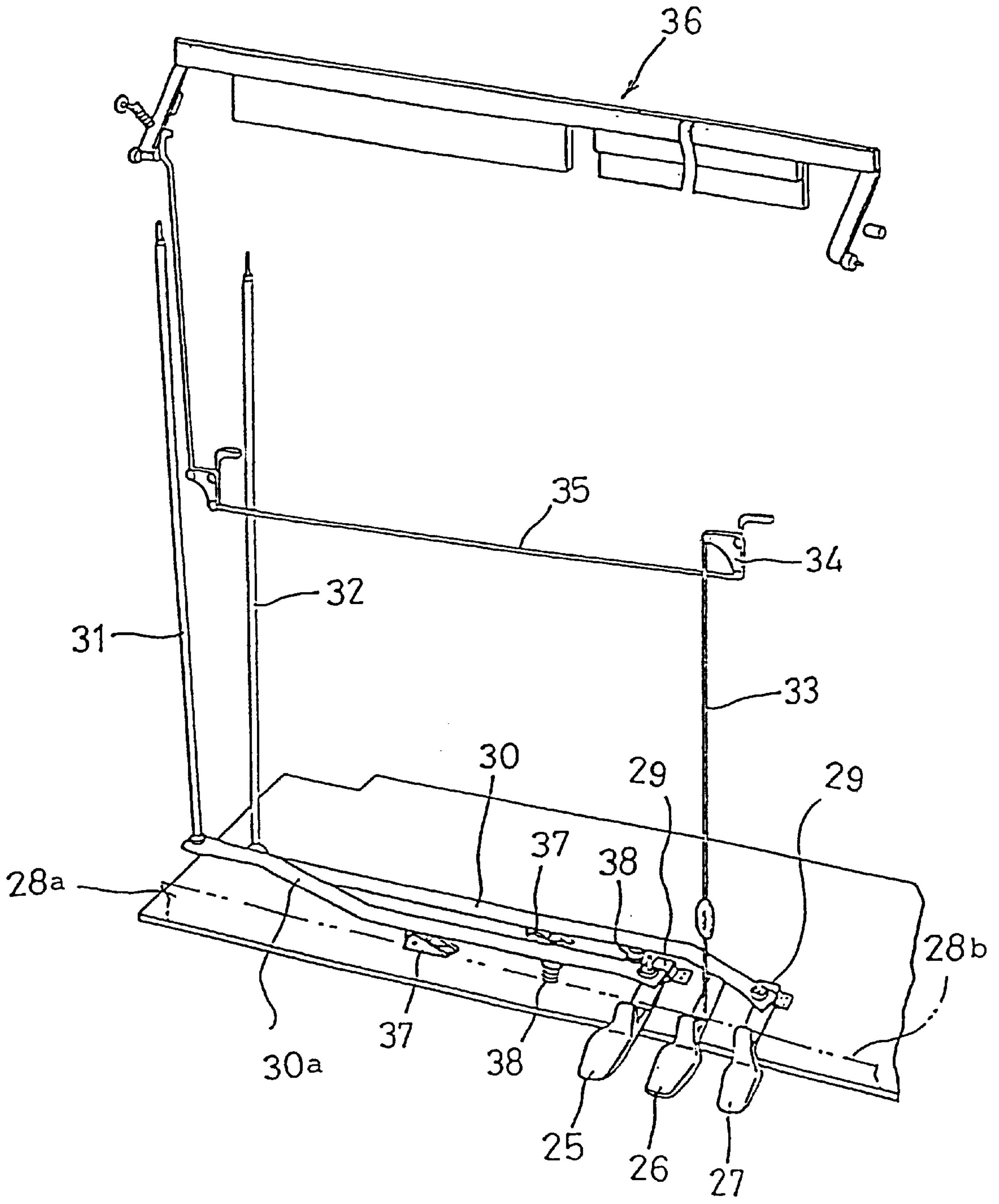
Fig. 7 PRIOR ART
FIG. 7 is a perspective view showing the arrangement of the prior art pedal mechanisms incorporated in the upright piano.
Figure 8:
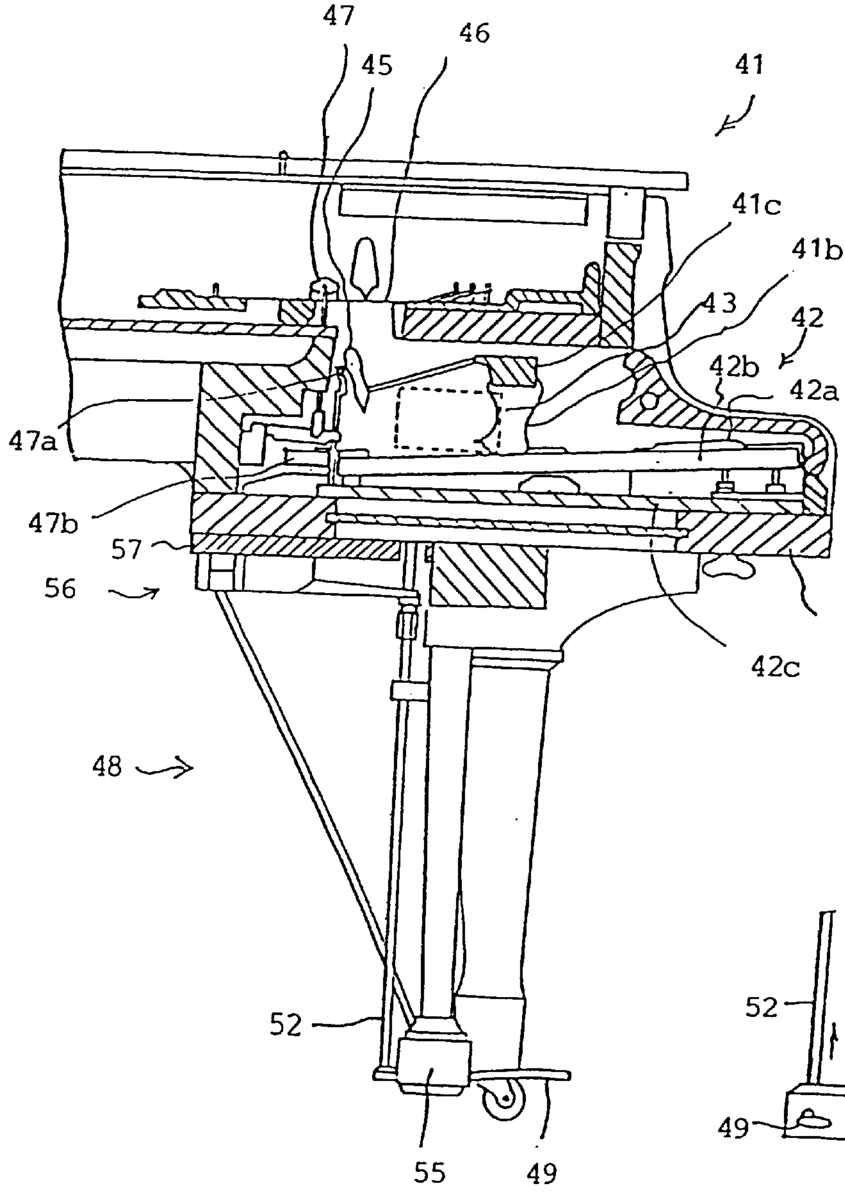
FIG. 8 is a partially cut-away side view showing the structure of a grand piano according to the present invention.
Figure 9:
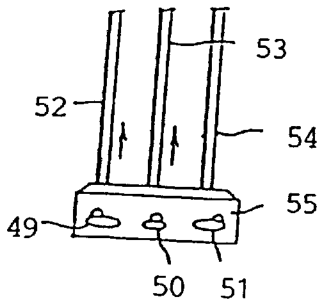
FIG. 9 is a front view showing three pedals incorporated in the grand piano.

Referring to FIGS. 8 and 9 of the drawings, a grand piano embodying the present invention largely comprises a piano housing 41, a keyboard 42, action mechanisms 43, hammer assemblies 45, strings 46, dampers 47 and a pedal system 48. The piano housing 41 defines an inner space, and a key bed or plate 41*a* forms a part of the piano housing 41. The keyboard 42 includes black keys 42*a*, white keys 42*b* and a key fame 42*c*, and is mounted on the key bed 41*a*. A pianist selectively depresses the front portions of the black/white keys 42*a*/42*b*. Then, the front portion of the depressed key 42*a*/42*b* is sunk, and, accordingly, the rear portion is lifted.

The action mechanisms 43 are respectively linked with the black/white keys 42*a*/42*b*, and are located over the rear portions of the black/white keys 42*a*/42*b*. The hammer assemblies 45 are rotatably supported by action brackets 41*b* through a shank flange rail 41*c*, and are driven for rotation by the action mechanisms 43. The strings 46 are stretched over the hammer assemblies 45, and vibrate for generating piano tones. The action mechanisms 43 are selectively actuated by the associated depressed keys 42*a*/42*b*, and the jacks (not shown) of the action mechanisms 43 escape from the associated hammer assemblies 45. The escape gives rise to free rotation of the hammers 45, and the strings 46 are struck by the hammer assemblies 45 at the end of the free rotation.

The dampers 47 are linked with the rear portions of the black/white keys 42*a*/42*b*, and are spaced from and brought into contact with the associated strings 46. While the black/white keys 42*a*/42*b* are resting, the dampers 47 are held in contact with the associated strings 46, and prohibits the strings from vibrations. When the pianist selectively depresses the black/white keys 42*a*/42*b*, the rear portions of the depressed keys 42*a*/42*b* upwardly push the associated dampers 47, and the dampers 47 are spaced from the strings 46. The dampers 47 permit the associated strings 46 to vibrate. Thereafter, the hammers 45 are brought into collision with the strings 46, and the strings 46 vibrate for generating the piano tones.

A sostenuto rod 47*a* and a lifting rail 47*b* are associated with the dampers 47. The lifting rail 47*b* laterally extends under the dampers 47, and is used for keeping the dampers 47 spaced from the strings 46. The sostenuto rod 47*a* laterally extends in front of the dampers 47, and selectively prohibits the dampers 47 from being brought into contact with the associated strings 46.

The pedal system 48 includes a soft pedal mechanism, a sostenuto pedal mechanism and a damper pedal mechanism. The sostenuto rod 47*a* forms a part of the sostenuto pedal mechanism, and the lifting rail 47*b* is incorporated in the damper pedal mechanism. When the pianist actuates the sostenuto pedal mechanism after depressing the black/white key 42*a*/42*b*, the sostenuto rod 47*a* is rotated, and prohibits the associated damper 47 from absorbing the vibrations through the contact with the strings 46, and the piano tone is prolonged. The pianist actuates the damper pedal mechanism for lifting all the dampers 47. The lifting rail 47*b* keeps the dampers 47 spaced from the strings 46 regardless of the key positions. For this reason, the pianist can prolong the piano tones by actuating the damper pedal mechanism.

On the other hand, the soft pedal mechanism is linked with the key frame 42*c*, and the key frame 42*c* is driven for lateral movement on the key bed 41*a*. When the key frame 42*c* is laterally moved, the hammer assemblies 45 are slightly offset from the associated strings 46. For this reason, the hammer assemblies 45 strike the associated strings 46 less than the normal number of the strings 46. Thus, the pianist actuates the soft pedal mechanism for reducing the loudness.

The pedal system 48 includes a soft pedal 49, a sostenuto pedal 50, a damper pedal 51, a soft pedal rod 52, a sostenuto pedal rod 53 and a damper pedal rod 54. The soft pedal 49, the sostenuto pedal 50 and the damper pedal 51 project from a pedal box 55 as shown in FIG. 9. The soft pedal 49 and the damper pedal 51 are located on the left side portion and the right side portion of the pedal box 55, and the sostenuto pedal 50 is provided between the soft pedal 49 and the damper pedal 51. The soft pedal rod 52, the sostenuto pedal rod 53 and the damper pedal rod 54 are connected to the rear portions of the soft pedal 49, the sostenuto pedal 50 and the damper pedal 51, respectively, and vertically extend from the rear portions. The soft pedal 49, the sostenuto pedal 50 and the damper pedal 51 are independently turnable with respect to brackets (not shown) provided inside the pedal box 55. When the pianist steps on the soft/sostenuto/damper pedal 49/50/51, the soft/sostenuto/damper pedal 52/53/54 is upwardly moved. When the pianist releases the soft/sostenuto/damper pedal 49/50/51, the soft/sostenuto/damper pedal rod 52/53/54 is pushed down so as to return the rest position thereof.

The pedal system 48 further includes three link works assembled into a unit 56. The unit 56 is fixed to the lower surface of the key bed 41*a*, and the three link works are connected between the soft/sostenuto/damper pedal rods 52/53/54 and the key frame/sostenuto rod/lifting rail 42*c*/47*a*/47*b*, respectively. The force exerted on each soft/sostenuto/damper pedal 49/50/51 is transmitted through the associated link work to the key frame 42*c*, the sostenuto rod 47*a* or the lifting rail 47*b*.

Figure 10:
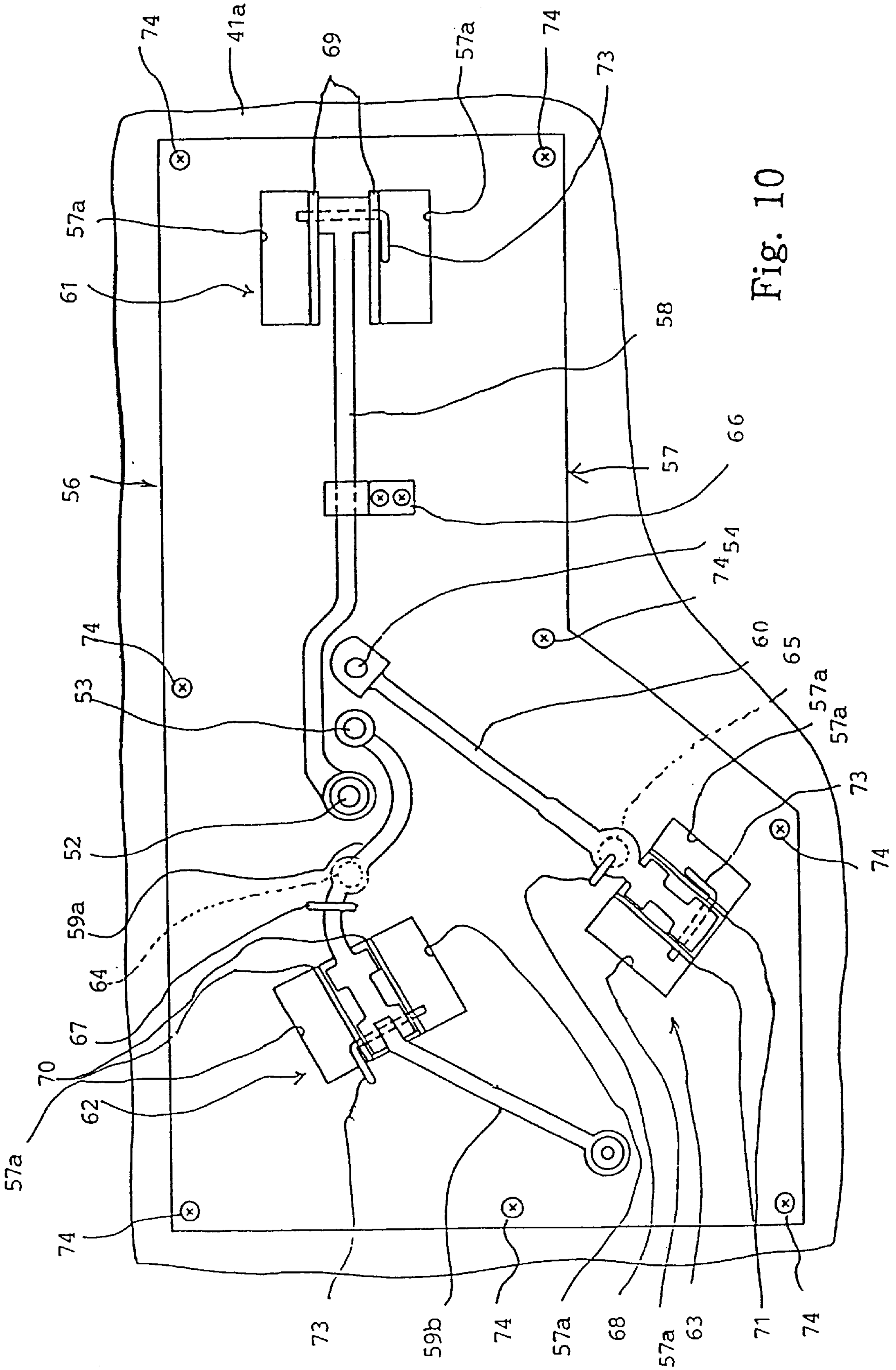
FIG. 10 is a bottom view showing the arrangement of pedal mechanisms assembled into a unit.

Turning to FIG. 10, the unit 56 includes a base plate 57, a soft pedal lever 58, sostenuto pedal levers 59*a*/59*b*, a damper pedal lever 60, bearing units 61/62/63, coil springs 64/65 and stoppers 66/67/68. The soft pedal lever 58, the bearing unit 61 and the stopper 66 form parts of the link work between the soft pedal rod 52 and the key frame 42*c*, and the sostenuto pedal levers 59*a*/59*b*, the bearing unit 62, the coil spring 64 and the stopper 67 are incorporated in the link work connected between the sostenuto pedal rod 53 and the sostenuto rod 47*a*. The link work for the damper pedal rod 54 includes the damper pedal lever 60, the bearing unit 63, the coil spring 65 and the stopper 68. Thus, the link works are similar in structure to those of the prior art link works. However, the bearing units 61/62/63 and the stoppers 66, 67. 68 are fixed to the base plate 57, and the coil springs 64/65 are inserted between the base plate 57 and the pedal levers 59*a*/60.

Figure 11:
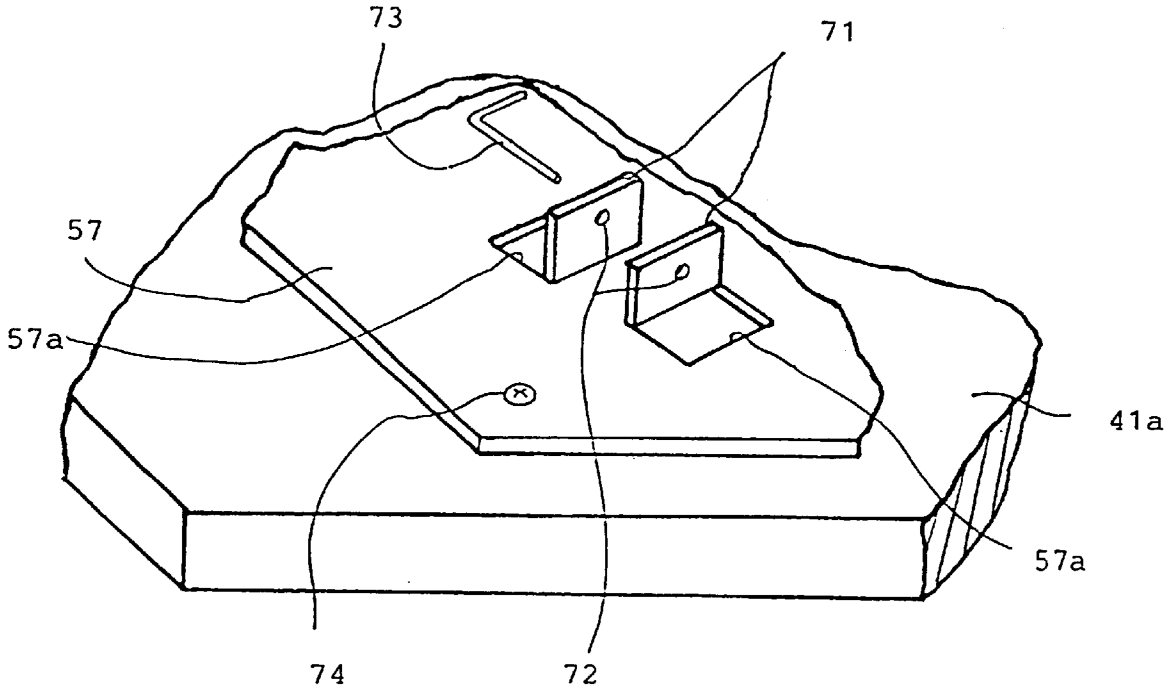
FIG. 11 is a perspective view showing a bearing unit incorporated in the pedal mechanism.

The base plate 57 is formed from a steel plate through a pressing, and three pairs of bearing plates 69/70/71 are cut out in the base plate 57. As a result, hollow spaces 57*a* are left in the base plate 57. Through-holes 72 are formed in each pair of bearing plates 69/70/71 (see FIG. 11), and the through-hole of each pair is aligned with the other through-hole of the same pair. A pin 73 is inserted into the through-holes 72, and the pedal levers 58/59*a*/59*b*/60 are engaged with the pins 73. Thus, the pedal levers 58/59 are rotatable with respect to the pins 73. The base plate 57 is fixed to the lower surface of the key bed 41*a* by means of bolts 74.

The pedal system 48 is installed in the grand piano as follows. A steel plate is machined so as to form the base plate 57. The bearing plates 69/70/71 are cut out, and are upright on the base plate 57. The base plate 57 is placed on a working table, and a factory worker assembles the pedals levers 58/59*a*/59*b*/60, the pins 73, the stoppers 66/67/68 and the coil springs 64/65 into the three link works. While the factory worker is assembling the parts into the link works, the factory worker is free from the piano housing, and does not feel the assembling work uncomfortable.

Upon completion of the assembling work, the factory worker conveys the resultant base plate 57 to the piano housing, and fixes the base plate 57 to the lower surface of the key bed 41*a* by means of the bolts 74. Although the factory worker forces himself to get into the narrow space under the key bed 41*a,* the work is simple, and the factory worker can complete the work within a short time.

Finally, the soft pedal rod 52, the sostenuto pedal rod 53 and the damper pedal rod 54 are connected between the soft/sostenuto/damper pedals 49/50/51 and the soft/sostenuto/damper pedal levers 58/59/60, respectively.

As will be understood from the foregoing description, the link works are assembled into the unit according to the present invention, and the factory worker simply fixes the base plate 57 to the lower surface of the key bed 41*a* by means of the bolts 74. The assemblage of the link works is carried out on the working table, and the work efficiency is enhanced. Moreover, the bearing plates 69 are cut out in the base plate 57. This results in reduction of the number of component parts. The manufacturer can reduce the production cost by virtue of the high work efficiency and the reduction of component parts. Thus, the pedal system according to the present invention is advantageous over the prior art pedal system in the production cost.

In the above-described embodiment, the action mechanisms 43, the hammer assemblies 45 and the dampers 47 serve as plural vibration generating mechanisms.

Second Embodiment

Figure 12:
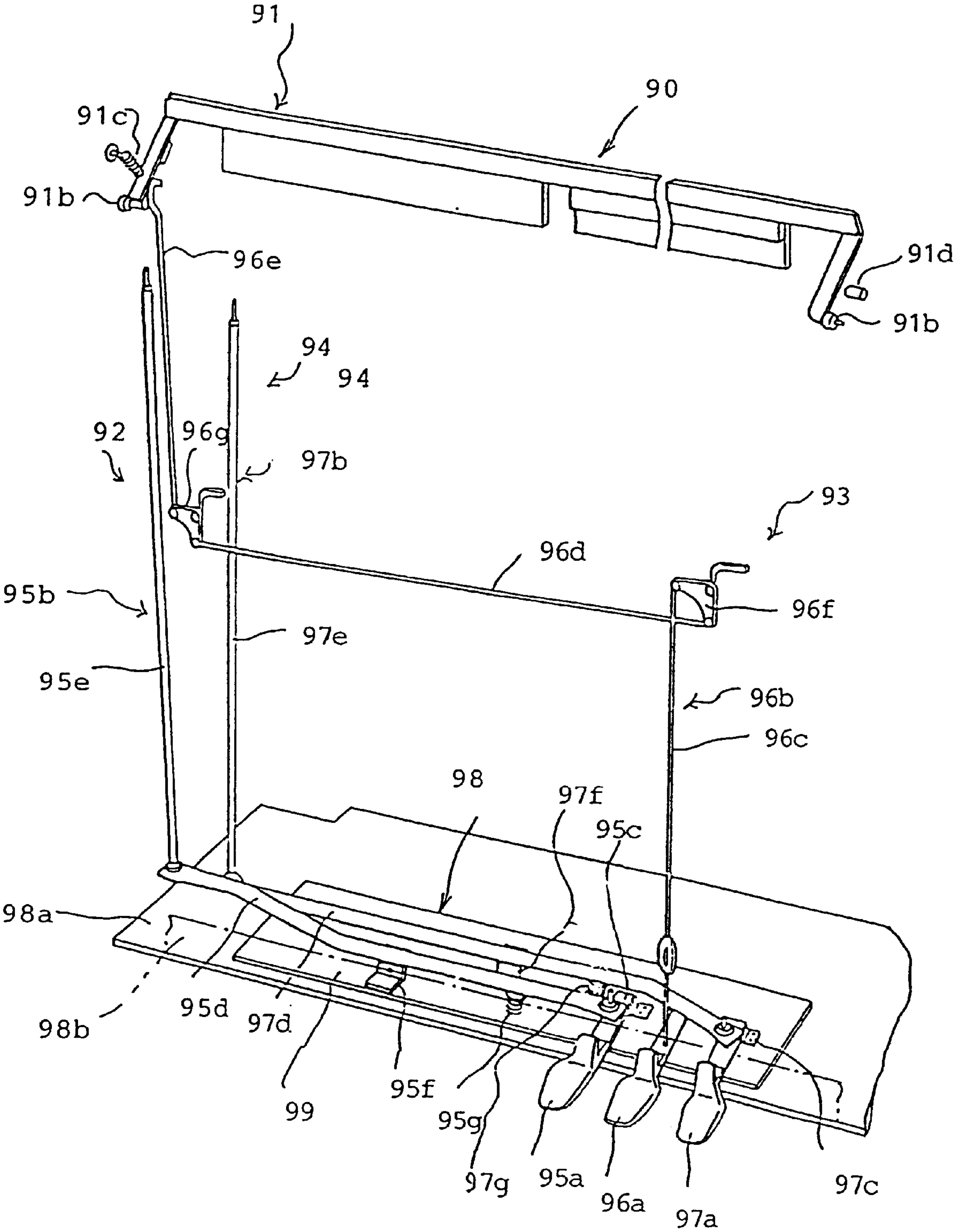
FIG. 12 is a perspective view showing pedal mechanisms assembled in a unit and incorporated in an upright piano.

Turning to FIG. 12 of the drawings, a pedal system 90 is incorporated in an upright piano embodying the present invention. Although the upright piano has a keyboard, action mechanisms, hammer assemblies, strings, dampers, a damper rail and a damper rod, they are similar to those of the standard upright piano. For this reason, only the pedal system 90 is shown in FIG. 12 together with a muffler 91.

The pedal system 90 includes a soft pedal mechanism 92 connected to the damper rail, a muffler pedal mechanism 93 connected to the muffler 91 and a damper pedal mechanism 94 connected to the damper rod. The soft pedal mechanism 92 includes a soft pedal 95*a* and a link work 95*b,* the muffler pedal mechanism 93 includes a muffler pedal 96*a* and a link work 96*b,* and the damper pedal mechanism 94 includes a damper pedal 97*a* and a link work 97*b.* Various boards are assembled into a piano housing. A bottom board or plate 98*a* and a bottom sill 98*b* form parts of the piano housing. The soft pedal mechanism 92, the muffler pedal mechanism 93 and the damper pedal mechanism 94 are installed inside the piano housing. The three pedal mechanisms 95, 96 and 97 are assembled into a unit 98 according to the present invention.

The link work 95*b* includes a bracket 95*c,* a soft pedal lever 95*d,* a soft pedal rod 95*e,* a bearing unit 95*f* and a coil spring 95*g.* Similarly, the link work 97*b* includes a bracket 97*c,* a damper pedal lever 97*d,* a damper pedal rod 97*e,* a bearing unit 97*f* and a coil spring 97*g.* On the other hand, the link work 96*b* includes a bracket (not shown), muffler pedal rods 96*c*/96*d*/96*e* and muffler pedal levers 96*f*/96*g*. The link works 95*b,* 96*b* and 97*b* are assembled on a board 99 as follows.

The soft pedal 95*a* is swingably supported by the bracket 95*c*. The soft pedal 95*a* is connected at the rear end portion thereof to the right end portion of the soft pedal lever 95*d,* which in turn is connected at the left end portion to a lower end of the soft pedal rod 95*e.* The soft pedal lever 95*d* is rotatably supported by the bearing unit 95*f,* and the coil spring 95*g* urges the soft pedal lever 95*a* upwardly. The bearing unit 95*f* is similar in structure to the bearing units 61/62/63 of the first embodiment, and is fixed to the upper surface of the base plate 99. The coil spring 95*g* is inserted between the upper surface of the base plate 99 and the lower surface of the soft pedal lever 95*d.* When the pianist steps on the soft pedal 95*a,* the soft pedal 95*a* pushes down the right portion of the soft pedal lever 95*d* against the elastic force of the coil spring 95*g,* and the soft pedal lever 95*d* turns around the bearing unit 95*f.* This results in that the left portion of the soft pedal lever 95*d* is moved upwardly. The left portion of the soft pedal lever 95*d* pushes the soft pedal rod 95*e* upwardly, and the movement of the soft pedal rod 95*e* gives rise to decrease of the gap between the damper rail and the strings. When the pianist releases the soft pedal 95*a,* the coil spring 95*g* causes the soft pedal 95*a* and the link work 95*b* to return to the rest position.

The muffler pedal 96*a* is swingably supported by the bracket (not shown), and is connected at the rear end thereof to the muffler pedal rod 96*c.* The muffler pedal rod 96*c* upwardly extends from the rear portion of the muffler pedal 96*a,* and is connected to one end of the muffler pedal lever 96*f.* The muffler pedal lever 96*f* is turnably supported by a board (not shown), and the muffler pedal rod 96*d* is connected to the other end of the muffler pedal lever 96*f.* The muffler pedal rod 96*d* laterally extends. Thus, the muffler pedal lever 96*f* changes the movement of the muffler pedal rod 96*c* in the up-and-down direction to the movement of the muffler pedal rod 96*d* in the lateral direction. The muffler pedal rod 96*d* is connected at the other end to one end of the muffler pedal lever 96*g,* and the muffler pedal lever 96*g* is turnably supported by the board. The muffler pedal lever 96*g* is connected at the other end to the lower end of the muffler pedal lever 96*e,* and the muffler pedal rod 96*e* is connected at the upper end thereof to the muffler 91. The muffler pedal lever 96*g* converts the lateral movement of the muffler pedal rod 96*d* to the movement of the muffler pedal rod 96*e* in the up-and- down direction. When the pianist steps on the muffler pedal 96*a,* the muffler pedal rod 96*c* is pulled down, and causes the muffler pedal lever 96*f* to move the muffler pedal rod 96*d* rightward. The muffler pedal rod 96*d* causes the muffler pedal lever 96*g* to move the muffler pedal rod 96*e* downwardly, and the downward motion of the muffler pedal rod 96*e* gives rise to rotation of the muffler 91 around pins 91*b* against the elastic force of a return spring 91*c* until the muffler 91 is brought into contact with a stopper 91*d.* When the pianist releases the muffler pedal 96*a,* the muffler pedal 96*a* and the link work 96*b* return to the rest position due to the elastic force of the return spring 91*c*.

The damper pedal 97*a* is swingably supported by the bracket 97*c,* and is connected at the rear end thereof to the right end portion of the damper pedal lever 97*d,* which in turn is connected at the left end portion to the lower end of the damper pedal rod 97*e.* The damper pedal lever 97*d* is rotatably supported by the bearing unit 97*f,* and the coil spring 97*g* urges the damper pedal lever 97*d* upwardly. The bearing unit 97*f* is similar in structure to the bearing units 61/62/63, and is fixed to the upper surface of the base plate 99. The coil spring 97*g* is inserted between the upper surface of the base plate 99 and the lower surface of the damper pedal lever 97*d.* When the pianist steps on the damper pedal 97*a,* the damper pedal 97*a* pushes down the right portion of the damper pedal lever 97*d* against the elastic force of the coil spring 97*g,* and the damper pedal lever 97*d* turns around the bearing unit 97*f*. This results in that the left portion of the damper pedal lever 97*d* is moved upwardly. The left portion of the damper pedal lever 97*d* pushes the damper pedal rod 97*e* upwardly, and the movement of the damper pedal rod 97*e* causes the dampers to be spaced from the strings regardless of the key positions. When the pianist releases the damper pedal 97*a*, the coil spring 97*g* causes the damper pedal 97*a* and the link work 97*b* to return to the rest position.

As described hereinbefore, the brackets 95*c*/97*c* and the bearing units 95*f*/97*f* are directly fixed to the base plate 99, and the coil springs 95*g*/97*g* are inserted between the upper surface of the base plate 99 and the associated pedal levers 95*d*/97*d*. Therefore, a factory worker places the base plate 99 on a working table (not shown), and assembles the component parts into unit 98. Upon completion of the assemblage, the factory worker conveys the unit 98 to the piano housing, and fixes the base plate 99 to the bottom board 98*a* by means of bolts (not shown).

While the factory worker is assembling the component parts into the unit 98, the factory worker stands in a comfortable position before the working table, and handles the tools. The factory worker does not feel the assembling work uncomfortable, and the work efficiency is enhanced. The bearing plates are cut out, and the component parts are reduced. As a result, the production cost is lowered.

Although particular embodiments of the present invention have been shown and described, it will be apparent to those skilled in the art that various changes and modifications may be made without departing from the spirit and scope of the present invention.

A pedal system may be constituted by the soft pedal mechanism and the damper pedal mechanism, only.

The present invention is applicable to other kinds of keyboard musical instrument in so far as pedal mechanisms form parts of the keyboard musical instruments. One of these kinds of keyboard musical instrument is an electric piano. The electric piano is fabricated on the basis of an acoustic piano, and a pickup unit such as an array of piezoelectric elements is incorporated therein. The vibrations of strings are converted to electric signals by means of the pickup unit, and electric tones are generated from the electric signals through an equalizer. The dampers according to the present invention are used for absorbing the vibrations.

Another kind of keyboard musical instrument to which the present invention appertains is a silent piano. The silent piano is also fabricated on the basis of an acoustic piano, and a silent system and an electronic sound generating system are incorporated therein. The silent system has a hammer stopper provided between the sets of strings and the hammer shanks, and is changed between a free position and a blocking position. When a pianist wishes to play a tune through the piano tones, the hammer stopper is changed to the free position. The hammer stopper at the free position is out of the trajectories of the hammer shanks. While the pianist is playing the tune, the hammers strike the associated sets of strings, and rebound on the strings. On the other hand, when the pianist wishes to practice the fingering without any acoustic tone, the pianist changes the hammer stopper to the blocking position. The hammer stopper at the blocking position is on the trajectories of the hammer shanks. Although the action mechanisms escape from the hammers, the hammers rebound on the hammer stopper before striking the sets of strings, and any acoustic tone is generated from the strings. However, the electronic sound generating system monitors the key/hammer motions, and generates electronic tones through a headphone. Thus, the pianist can check the fingering without disturbance to the neighborhood. In the silent system, the dampers according to the present invention are also used for absorbing the vibrations of the strings.

Yet another kind of keyboard musical instrument is an automatic player piano. The automatic player piano is also fabricated on an acoustic piano. The automatic player piano has an array of solenoid-operated key actuators embedded in the key bed, and a controller supplies driving signals to the solenoid-operated key actuators for actuating the action mechanisms without any fingering on the keyboard. A set of music data codes is loaded to the controller, and the controller determines the black/white keys to be moved, times to move the black/white keys and the magnitude of the key velocity on the basis of the music data codes. The controller produces the driving signals, and selectively supplies the driving signals to the solenoid-operated key actuators. The solenoid-operated key actuators are selectively energized with the driving signals, and the plungers project so as to move the associated black/white keys. The dampers according to the present invention are provided in the automatic player piano, and absorb the vibrations of the strings. The automatic player piano is further equipped with the silent system.

What is claimed is:

1. A pedal system incorporated in a keyboard musical instrument, comprising:

a base plate having a major surface and to be attached to a first plate forming part of a housing of said keyboard musical instrument in such a manner that said base plate and said first plate are layered with one another;

plural foot pedals swingably supported by said base plate; and plural link works provided on said major surface, movably supported by said base plate and connected to said plural foot pedals, respectively.

2. The pedal mechanism as set forth in claim 1, in which said base plate is attached to a lower surface of a key bed serving as said first plate of said housing, and said housing is incorporated in a grand piano.

3. The pedal mechanism as set forth in claim 1, in which said base plate is attached to an upper surface of a bottom board serving as said first plate of said housing, and said housing is incorporated in an upright piano.

4. The pedal mechanism as set forth in claim 1, further comprising bearing units provided on said major surface and permitting said link works to move with respect to said base plate.

5. The pedal mechanism as set forth in claim 4, in which each of said bearing units has a pair of walls projecting from said major surface and formed with a pair of holes and a pin supported by said pair of walls for movably supporting associated one of said link works.

6. The pedal mechanism as set forth in claim 5, in which said pair of walls is formed from portions of said base plate partially cut out from a remaining portion of said base plate.

7. The keyboard musical instrument comprising:

a keyboard having plural keys respectively assigned notes of a scale, and selectively moved;

plural sets of strings respectively associated with said plural keys, and independently vibrating for generating tones at said notes;

plural vibration generating mechanisms respectively connected to said plural keys for generating vibrations in the strings of said plural sets when said plural keys are selectively moved;

a housing accommodating said plural sets of strings and said plural vibration generating mechanisms, supporting said keyboard in such a manner as to expose said keyboard to said player, and having a first plate; and plural pedal mechanisms linked with said plural vibration generating mechanisms, selectively actuated for changing attributes of said tones, and including a base plate and component parts assembled into a unit attached to said first plate of said housing in such a manner that said base plate and said first plate are layered with one another.

8. The keyboard musical instrument as set forth in claim 7, in which said component parts are broken down into foot pedals, supporting members attached to said base plate and link works supported by said supporting members and connected between said foot pedals and said plural vibration generating mechanisms.

9. The keyboard musical instrument as set forth in claim 7, in which said base plate is fixed to said first plate of said housing by means of bolts.

10. The keyboard musical instrument as set forth in claim 7, in which each of said plural vibration generating mechanisms includes an action mechanism connected to associated one of said plural keys, a hammer assembly linked with said action mechanism and driven for rotation when said associated one of said plural keys actuates said action mechanism and a damper actuated by said associated one of said plural keys so as to be spaced from associated one of said plural sets of strings before said hammer assembly strikes said associated one of said plural sets of strings.

11. The keyboard musical instrument as set forth in claim 10, in which said action mechanism is provided on a key bed serving as said first plate of said housing together with other action mechanisms associated with others of said plural keys, and said base plate is fixed to a lower surface of said key bed.

12. The keyboard musical instrument as set forth in claim 10, in which said action mechanism and said hammer assembly are mounted on a frame provided on a key bed of said housing and connected to one of said plural pedal mechanisms, and said hammer assembly is offset from said associated one of said plural sets of strings for decreasing the number of the strings to be struck by said hammer assembly when said one of said plural pedal mechanisms is actuated for moving said frame.

13. The keyboard musical instrument as set forth in claim 10, in which said damper and other dampers associated with others of said plural keys are connectable to one of said plural pedal mechanisms, and said one of said plural pedal mechanisms keeps said damper and said other dampers spaced from said plural sets of strings for prolonging said tones regardless of positions of said plural keys when said one of said plural pedal mechanisms is actuated.

14. The keyboard musical instrument as set forth in claim 10, in which said damper is connected to one of said plural pedal mechanisms, and said one of said plural pedal mechanisms prohibits said damper from being brought into contact with said associated one of said plural sets of strings after said associated one of said plural keys is released.

15. The keyboard musical instrument as set forth in claim 10, in which said action mechanism, said hammer assembly and said damper are provided in an upper chamber of said housing separated by a key bed from a lower chamber, and said base plate is fixed to an upper surface of bottom board serving as said first plate and partially defining said lower chamber.

16. The keyboard musical instrument as set forth in claim 10, in which one of said plural pedal mechanisms includes a muffler moved into and out of a space between said hammer assembly and said associated one of said plural sets of strings.

17. An acoustic piano comprising a piano housing having a first plate partially defining an inner space, a keyboard having plural keys and supported by said piano housing in such manner as to permit a player to finger thereon, plural action mechanisms accommodated in said inner space and respectively linked with said plural keys for independently transferring forces exerted on the associated keys therethrough, plural hammer assemblies accommodated in said inner space and respectively linked with said plural action mechanisms so as to be driven for free rotation when said forces are transferred thereto, plural set of strings accommodated in said inner space and respectively struck by said hammer assemblies so as to vibrate for generating tones, plural dampers accommodated in said inner space and respectively actuated by said plural keys so as to be spaced from said plural sets of strings, and a pedal mechanism including a base plate attached to said fist plate in such manner that said base plate and said first plate are layered with one another, a soft pedal mechanism having a soft pedal swingably supported by said base plate and a link work movably supported by said base plate and connected between said soft pedal and a movable member associated with either plural hammer assemblies or plural dampers for lessening said tones, and a damper pedal mechanism having a damper pedal swingably supported by said base plate and another link work movably supported by said base plate and connected between another movable member associated with said plural dampers for prolonging said tones.

* * * * *